March 19, 1957 A. Y. DODGE 2,785,782
WEDGE TYPE ONE-WAY CLUTCH
Filed July 8, 1953
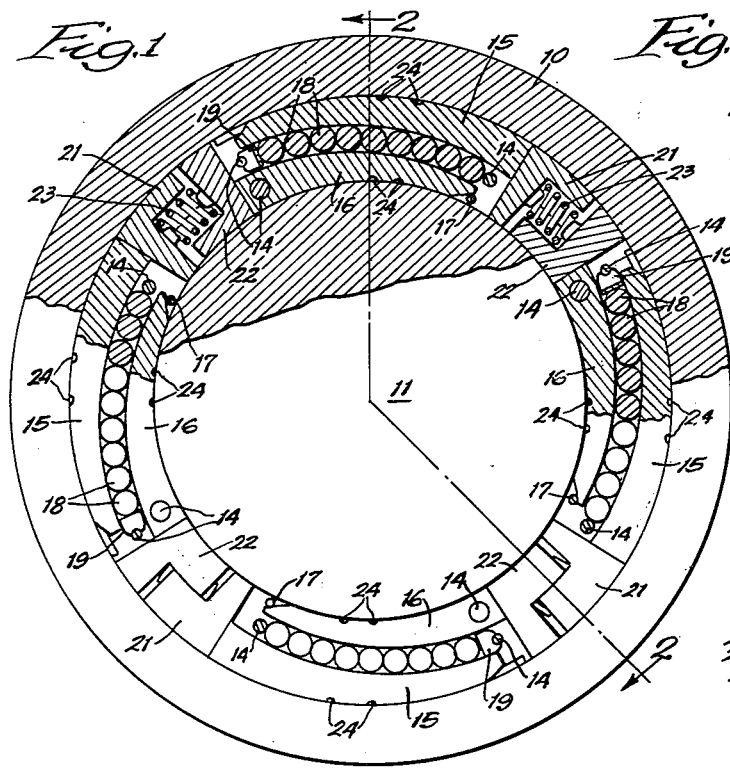
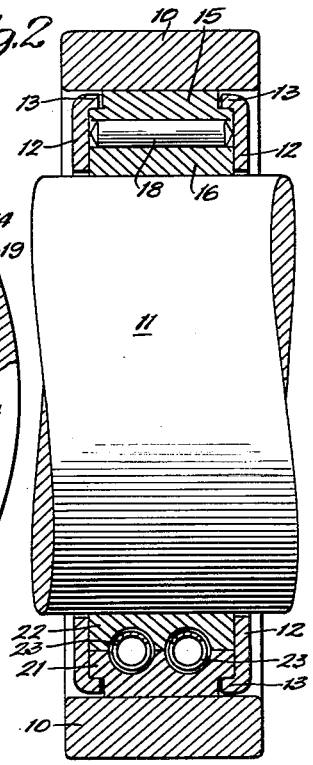
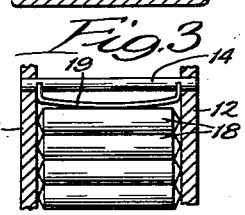
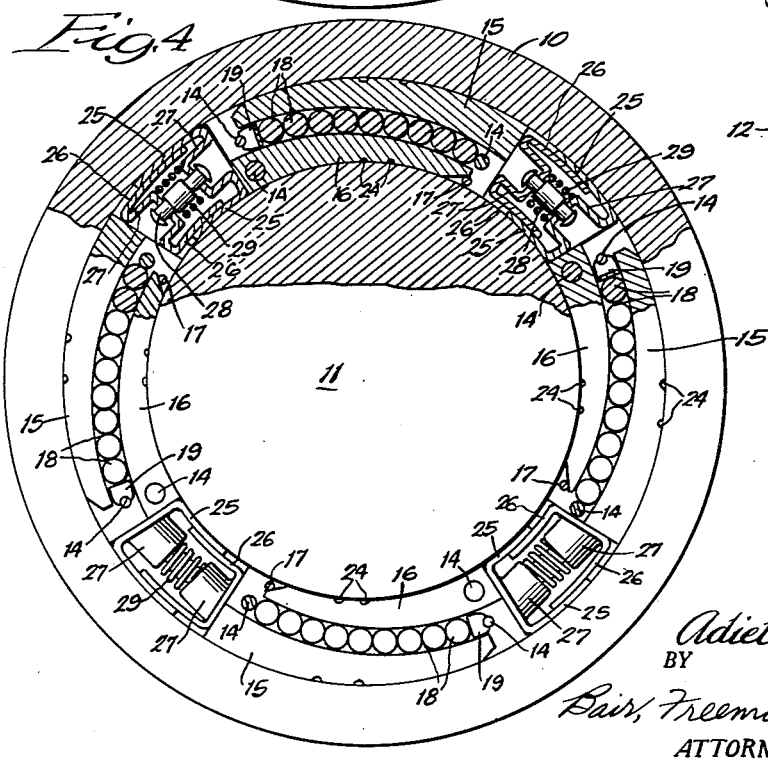
INVENTOR:
Adiel Y. Dodge,
BY
Bair, Freeman & Molinare
ATTORNEYS.

United States Patent Office 2,785,782
Patented Mar. 19, 1957

2,785,782

WEDGE TYPE ONE-WAY CLUTCH

Adiel Y. Dodge, Rockford, Ill., assignor to Borg-Warner Corporation, Chicago, Ill., a corporation of Illinois Application July 8, 1953, Serial No. 366,792

9 Claims. (Cl. 192—45)

This invention relates to one-way clutches and more particularly to one-way clutches of the friction wedge type.

One-way clutches employing friction wedges have heretofore been proposed as for example in my Patent No. 2,039,149. Such clutches have in general been difficult to assemble due to the necessity of handling a large number of parts in making the assembly between the races and further have not been capable of functioning as bearings during overrunning.

It is one object of the present invention to provide a one-way clutch of the friction wedge type which may be stored and handled as a complete unit apart from the races and assembled as a unit between the races.

Another object is to provide a one-way clutch which functions to connect the races in one direction of relative rotation thereof and which acts as a bearing on which the races can run in the opposite direction of relative rotation.

A further object is to provide a one-way clutch in which separate wedges are employed to engage the different races and are connected to each other for relative sliding movement through rotatable bearing elements.

According to one feature of the invention the bearing elements are resiliently held in proper position for an engaging operation by springs.

A further object is to provide a one-way clutch in which spring means are employed urging the wedges toward their clutch engaging position and which function as stops to limit movement of the wedges toward disengagement whereby they can function as bearings.

According to an important feature of the invention all of the elements are held together in an assembly by a cage so that the clutch can be handled as a unit with all elements maintained in proper cooperative relationship with each other.

The above and other objects and features of the invention will be more readily apparent from the following description when read in connection with the accompanying drawing in which Figure 1 is an end elevation with parts in section of a one-way clutch assembly embodying the invention. Figure 2 is a section on the line 2—2 of Figure 1. Figure 3 is a partial elevation of the cage and bearing assembly and Figure 4 is a view similar to Figure 1 of a modified construction.

The clutch as shown in Figures 1 to 3 is adapted to connect an outer race 10 to an inner race 11 when the outer race tends to turn counterclockwise relative to the inner race. The races 10 and 11 are concentrically arranged with concentric spaced cylindrical surfaces between which the clutch is mounted.

The clutch comprises a cage including a pair of side rings 12 having internal flanges 13 at their outer edges and connected in spaced relationship by a plurality of rivets or similar cross members 14. The side rings received between them a series of outer wedges 15 which have cylindrical outer surfaces and cylindrical inner surfaces eccentric to the outer surfaces as best seen in Figure 1. The wedges 15 are offset at their sides to provide channels into which the flanges 13 fit so that the wedges will be retained in the cage but can move both circumferentially and radially therein to a limited extent. Inner wedges 16 formed similarly to the wedges 15 with cylindrical eccentric surfaces are secured in the inner portion of the cage in registry with the outer wedges. The inner wedges are preferably held in place by certain of the cross rivets 14 which extend through openings in the thicker ends of the inner wedges with a slight degree of clearance to permit necessary radial movement of the wedges to engage and disengage the inner race. At their opposite ends the inner wedges are cut off at an angle as shown and engage projections 17 on the cage side rings to limit outward swinging of the inner wedges so that they cannot be accidentally removed from the assembly.

The wedges are adapted to move circumferentially relative to each other on bearing elements shown as a series of cylindrical rollers 18 which fit in and substantially fill the spaces between the adjacent surfaces of the wedges. The rollers are held in place by the wedge surfaces and by rivets 14 which are positioned adjacent to the ends of the wedges in registry with the bearing space between them. Preferably the rollers are held in parallel alignment and urged toward the thick end of the wedges 15 and the thin end of the wedges 16 by springs 19. The springs 19 as shown may comprise thin strips of spring material of a width to fit between the wedges with their ends bent outward and notched to fit over the rivet 14 near the thin ends of the outer wedges. In this way the rollers are urged to a position in which they will always roll between the wedges during a clutch engaging movement.

The wedges are urged toward their engaged position by spring members fitting between adjacent sets of wedges. As shown the spring members comprise outer blocks 21 fitting against the outer race and engaging the thick ends of the outer wedges and inner blocks 22 fitting against the inner race and engaging the thick ends of the inner wedges. The blocks are drilled to receive compression springs 23 which urge them apart and interfit so that their movement toward each other is limited.

In operation when the outer race 10 turns counterclockwise relative to the inner race the outer wedge will tend to move with the outer race and will roll freely on the bearings 18 in a counterclockwise direction. This movement of the outer wedges is assisted by the spring members so that the clutch will engage rapidly. As the outer wedges move counterclockwise the effective radial thickness of each pair of wedges will increase to press the wedges tightly against the respective races to grip them. To facilitate this action the wedges may be formed with transverse oil grooves 24 into which oil between the wedge and race surfaces can be squeezed to permit rapid gripping.

When the outer race turns clockwise the outer wedges will tend to move clockwise relative to the inner wedges so that the effective radial thickness of the wedge pairs is decreased. After sufficient movement to take up the free motion provided by the spring elements the spring elements will act as rigid blocking members resting against the thick ends of the inner wedges to prevent further movement of the outer wedges. The amount of movement may be adjusted by design of the spring members so that the wedges will clear the races with just sufficient clearance for proper maintenance of an oil film. Thus the wedges can function as bearings on which the races run during overrunning and the spring members can be designed so that they will also function as bearing elements between the races during overrrunning.

The construction of Figure 4 is identical to that of Figures 1 and 3 except that different types of spring elements are employed. As shown in Figure 4 the spring elements are provided by sheet metal interfitting parts one of which is formed with inner and outer cylindrical flanges 25 to fit against the respective races and the other of which is formed with similar flanges 26 to fit slidably within the flanges 25. Each element is formed in its cental web portion with a cup-shaped projection 27 and a shouldered pin 28 has its ends extending slidably through openings in the bottoms of the projections 27 and riveted over to limit separation of the elements. A compression spring 29 surrounds the pin 28 and engages the projections 27 to urge the spring elements apart.

This spring element functions in the same manner as in those of Figure 1 to urge the outer wedges 15 in a counter-clockwise direction toward clutch engaging position. When the wedges 15 move clockwise the parts of the spring element will move toward each other until the bottoms of the projections 27 engage the shoulders on the pin 28 at which time the spring members act as solid blocks to limit further movement of the outer wedges.

While two embodiments of the invention have been shown and described in detail it will be understood that these are illustrative only and are not to be taken as a definition of the scope of the invention, reference being had for this purpose to the appended claims.

What is claimed is:

1. A one way clutch comprising an outer tapered wedge block having an external cylindrical surface to engage an outer cylindrical race, an inner tapered wedge block having an inner cylindrical surface to engage an inner cylindrical race, the wedge blocks being assembled in registering reversed relationship with their facing surfaces substantially uniformly spaced throughout their lengths, the wedge blocks being shiftable lengthwise relative to each other to change their total radial thickness; spring members interposed between said wedge blocks comprising an outer block in engagement with the outer race and in engagement with one of said wedge blocks, an inner block in engagement with the inner race and in engagement with the other of said wedge blocks, and spring means interposed between said inner and outer blocks effective to bias them toward engagement with said wedge blocks; and bearing elements between the wedge blocks to facilitate relative circumferential movement thereof.

2. A one way clutch comprising an outer tapered wedge block having an external cylindrical surface to engage an outer cylindrical race, an inner tapered wedge block having an inner cylindrical surface to engage an inner cylindrical race, the wedge blocks being assembled in registering reversed relationship with their facing surfaces substantially uniformly spaced throughout their lengths, the wedge blocks being shiftable lengthwise relative to each other to change their total radial thickness, bearing elements between the wedge blocks; spring members interposed between said wedge blocks comprising an outer block in engagement with the outer race and in engagement with one of said wedge blocks, an inner block in engagement with the inner race and in engagement with the other of said wedge blocks, and spring means interposed between said inner and outer blocks effective to bias them toward engagement with said wedge blocks to urge said wedge blocks in a direction to increase their total radial thickness, said spring members including stop means to limit movement of the wedge blocks in a direction relative to each other to decrease their total radial thickness whereby the wedge blocks may act as bearings between the races.

3. The construction of claim 2 in which the surfaces of the wedge blocks adjacent to the races are formed with transverse oil grooves.

4. A one way clutch comprising an outer tapered wedge block having an external cylindrical surface to engage an outer cylindrical race, an inner tapered wedge block having an inner cylindrical surface to engage an inner cylindrical race, the wedge blocks being assembled in registering reversed relationship with their facing surfaces substantially uniformly spaced throughout their lengths, the wedge blocks being shiftable lengthwise relative to each other to change their total radial thickness, rotatable bearing elements between the facing surfaces of the wedge blocks, stop elements to limit movement of the bearing elements relative to the wedge blocks, a spring acting on the bearing elements resiliently urging them to the position they normally occupy when the wedge blocks are in the relative position for minimum total radial thickness; spring members interposed between said wedge blocks comprising an outer block in engagement with the outer race and in engagement with one of said wedge blocks, an inner block in engagement with the inner race and in engagement with the other of said wedge blocks, and spring means interposed between said inner and outer blocks effective to bias them toward engagement with said wedge blocks to urge said wedge blocks in a direction to increase their total radial thickness, said spring members including stop means to limit movement of the wedge blocks in a direction to decrease their radial thickness.

5. A one way clutch for use with concentric cylindrical races comprising a cage including a pair of annular side rings to fit between the races, a plurality of inner tapered wedge members fitting between the side rings and having inner cylindrical surfaces, means to secure the wedge members to the side rings against circumferential movement but for free radial movement, a plurality of outer tapered wedge members mounted between the side rings for radial and circumferential movement in registering reversed relationship to the inner wedge members and with their inner surfaces uniformly spaced from the outer surfaces of the inner wedge members, the outer wedge members having outer cylindrical surfaces to engage the outer race, bearing elements between the facing surfaces of the wedge members; spring members interposed between said wedge blocks comprising an outer block in engagement with the outer race and in engagement with one of said wedge blocks, an inner block in engagement with the inner race and in engagement with the other of said wedge blocks, and spring means interposed between said inner and outer blocks effective to bias them toward engagement with said wedge blocks to urge said wedge blocks in a direction to effect wedging engagement, said spring members including stop means to limit movement of the outer wedge members in a releasing direction.

6. A one way clutch for use with concentric cylindrical races comprising a cage including a pair of annular side rings to fit between the races, a plurality of inner tapered wedge members fitting between the side rings and having inner cylindrical surfaces, means to secure the wedge members to the side rings against circumferential movement but for free radial movement, a plurality of outer tapered wedge members mounted between the side rings for radial and circumferential movement in registering reversed relationship to the inner wedge members and with their inner surfaces uniformly spaced from the outer surfaces of the inner wedge members, the outer wedge members having outer cylindrical surfaces to engage the outer race, a series of bearing rollers between the inner and outer wedge members, cross members on the cage registering with the bearing rollers to limit circumferential movement thereof, and a spring engaging one of the cross members and engaging the bearing rollers to urge them toward the thicker end of the outer wedge members.

7. A one way clutch for use with concentric cylindrical races comprising a cage including a pair of annular side rings to fit between the races, a plurality of inner tapered wedge members fitting between the side rings and having inner cylindrical surfaces, means to secure the wedge members to the side rings against circumferential movement but for free radial movement, a plurality of outer tapered wedge members mounted between the side rings for radial and circumferential movement in registering reversed relationship to the inner wedge members and with their inner surfaces uniformly spaced from the outer surfaces of the inner wedge members, the outer wedge members having outer cylindrical surfaces to engage the outer race, a series of bearing rollers between the inner and outer wedge members, cross members on the cage registering with the bearing rollers to limit circumferential movement thereof, a spring engaging one of the cross members and engaging the bearing rollers to urge them toward the thicker end of the outer wedge members; spring members interposed between said wedge blocks comprising an outer block in engagement with the outer race and in engagement with one of said wedge blocks, an inner block in engagement with the inner race and in engagement with the other of said wedge blocks, and spring means interposed between said inner and outer blocks effective to bias them toward engagement with said wedge blocks to urge said wedge blocks in a direction to effect wedging engagement with the races, said spring members including stop means to limit movement of the outer wedge members in a releasing direction.

8. A one way clutch for use with concentric cylindrical races comprising a cage including a pair of annular side rings to fit between the races, a plurality of inner tapered wedge members fitting between the side rings and having inner cylindrical surfaces, means to secure the wedge members to the side rings against circumferential movement but for free radial movement, a plurality of outer tapered wedge members mounted between the side rings for radial and circumferential movement in registering reversed relationship to the inner wedge members and with their inner surfaces uniformly spaced from the outer surfaces of the inner wedge members, the outer wedge members having outer cylindrical surfaces to engage the outer race, bearing elements between the facing surfaces of the wedge members; spring members interposed between said wedge blocks comprising an outer block in engagement with the outer race and in engagement with one of said wedge blocks, an inner block in engagement with the inner race and in engagement with the other of said wedge blocks, and spring means interposed between said inner and outer blocks effective to bias them toward engagement with said wedge blocks to urge said wedge blocks in a direction to effect wedging engagement, said spring members including stop means to limit movement of the outer wedge members in a releasing direction, the outer wedge members being formed with outwardly facing shoulders and the cage rings having inwardly turned flanges engageable with the shoulders to prevent radial removal of the outer wedge members from the cages.

9. A one way clutch for use with concentric cylindrical races comprising a cage including a pair of annular side rings to fit between the races, a plurality of inner tapered wedge members fitting between the side rings and having inner cylindrical surfaces, means to secure the wedge members to the side rings against circumferential movement but for free radial movement, a plurality of outer tapered wedge members mounted between the side rings for radial and circumferential movement in registering reversed relationship to the inner wedge members and with their inner surfaces uniformly spaced from the outer surfaces of the inner wedge members, the outer wedge members having outer cylindrical surfaces to engage the outer race, bearing elements between the facing surfaces of the wedge members, and spring means between the side rings acting on the wedge members, the spring means including a pair of relatively movable blocks one engaging both the thick end of an inner wedge member and one race and the other engaging both the thick end of a circumferentially spaced outer wedge member and the other race, a spring between the blocks urging them circumferentially apart, and interengaging parts on the blocks to limit circumferential movement thereof toward each other.

References Cited in the file of this patent

UNITED STATES PATENTS

| | | |
|---|---|---|
| 524,652 | Risinger | Aug. 14, 1894 |
| 1,618,915 | Constantinesco | Feb. 22, 1927 |
| 1,932,053 | Swartz | Oct. 24, 1933 |
| 1,946,048 | Verderber | Feb. 6, 1934 |